United States Patent
Nakao et al.

(10) Patent No.: US 7,892,328 B2
(45) Date of Patent: Feb. 22, 2011

(54) PSA APPARATUS FOR PRODUCING HIGH-PURITY HYDROGEN GAS

(75) Inventors: Noboru Nakao, Kobe (JP); Shinichi Miura, Kobe (JP); Takeshi Yamashita, Kobe (JP); Akitoshi Fujisawa, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 253 days.

(21) Appl. No.: 12/320,630

(22) Filed: Jan. 30, 2009

(65) Prior Publication Data
US 2009/0223371 A1    Sep. 10, 2009

(30) Foreign Application Priority Data

Mar. 6, 2008 (JP) ............................. 2008-056823
Oct. 10, 2008 (JP) ............................. 2008-263554

(51) Int. Cl.
*B01D 53/04* (2006.01)
(52) U.S. Cl. .......................................................... 96/132
(58) Field of Classification Search .................. 96/121, 96/132, 143; 423/247; 422/169, 170, 188–191, 422/193
See application file for complete search history.

(56) References Cited

U.S. PATENT DOCUMENTS

| | | | |
|---|---|---|---|
| 5,810,909 A * | 9/1998 | Notaro et al. ................... 95/96 |
| 5,914,455 A * | 6/1999 | Jain et al. ....................... 95/96 |
| 6,402,813 B2 * | 6/2002 | Monereau et al. ............... 95/96 |
| 6,572,681 B1 * | 6/2003 | Golden et al. .................. 95/122 |
| 6,764,535 B1 * | 7/2004 | Lansbarkis et al. ............. 96/132 |
| 7,179,324 B2 * | 2/2007 | Baksh et al. ................... 95/100 |
| 7,381,244 B2 * | 6/2008 | Tyndall et al. ................. 95/116 |
| 7,524,358 B2 * | 4/2009 | Saxena et al. .................. 95/118 |
| 7,674,539 B2 * | 3/2010 | Keefer et al. .................. 429/412 |
| 2006/0254425 A1 * | 11/2006 | Baksh et al. ................... 96/132 |
| 2008/0105122 A1 * | 5/2008 | Leitgeb et al. ................. 95/116 |
| 2010/0043635 A1 * | 2/2010 | Gueret et al. ................... 95/96 |

FOREIGN PATENT DOCUMENTS

| | | |
|---|---|---|
| JP | 2001-300244 | 4/2000 |
| JP | 2002-177726 | 12/2000 |
| JP | 2002-191923 | 12/2000 |
| JP | 2002-191924 | 12/2000 |

* cited by examiner

*Primary Examiner*—Frank M Lawrence
(74) *Attorney, Agent, or Firm*—Stites & Harbison, PLLC; Juan Carlos A. Marquez, Esq.

(57) ABSTRACT

A PSA apparatus for high-purity hydrogen gas production is provided which can recover high purity hydrogen gas at a high recovery rate from a reformed gas (hydrogen-containing gas) produced by a reforming process, for example an autothermal reforming process, and containing, as impurity components, at least CO, CO2, N2 and/or Ar, and can contribute to reducing the equipment size, hence reducing the equipment cost. The PSA apparatus for high-purity hydrogen gas B production by removing CO, CO2 and N2 by adsorption from a hydrogen containing gas A, comprises an adsorption tower 1; and an adsorbent bed 2 in the adsorption tower, wherein, on the occasion of regeneration of the adsorbent bed 2, a purge gas C is passed through in the direction opposite to the direction of passage of the hydrogen-containing gas A.

11 Claims, 9 Drawing Sheets

FIG.1A
FIG.1B
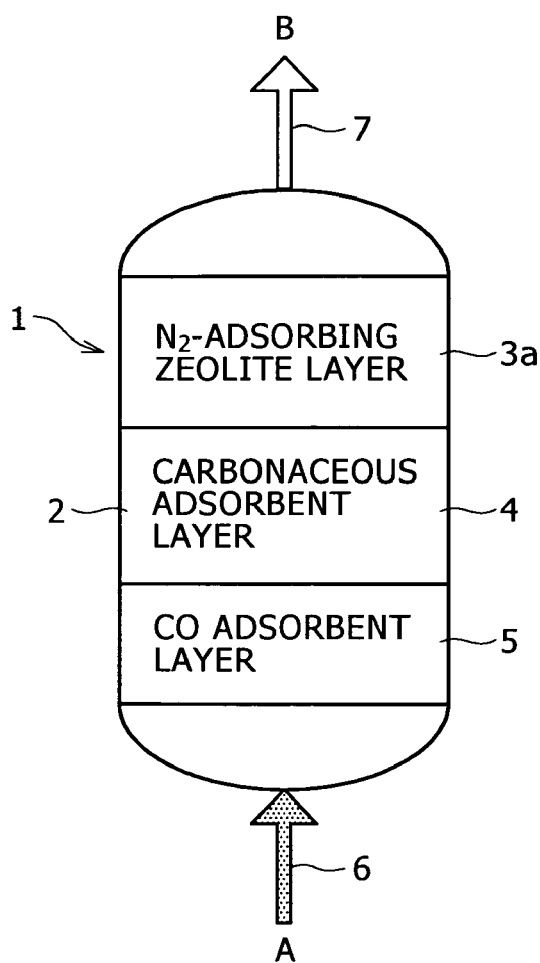
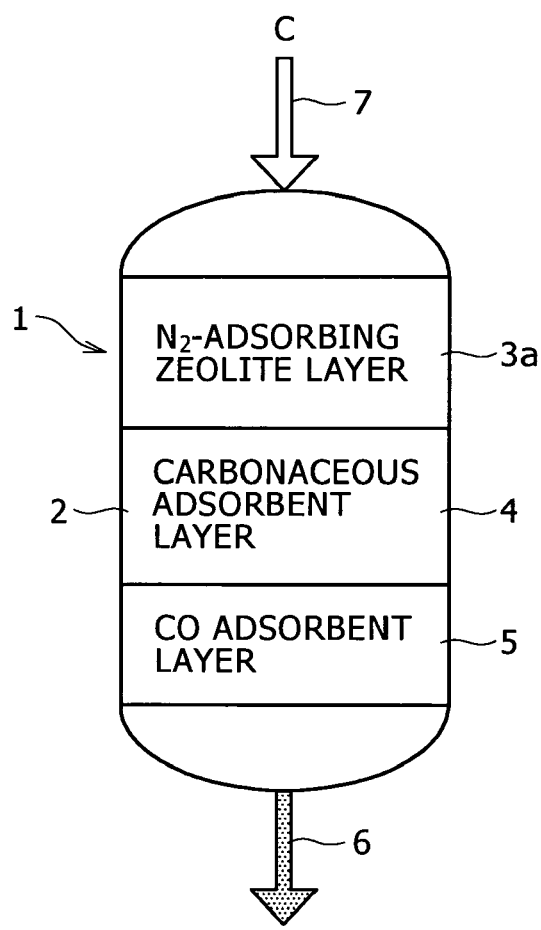

FIG. 3A
FIG. 3B
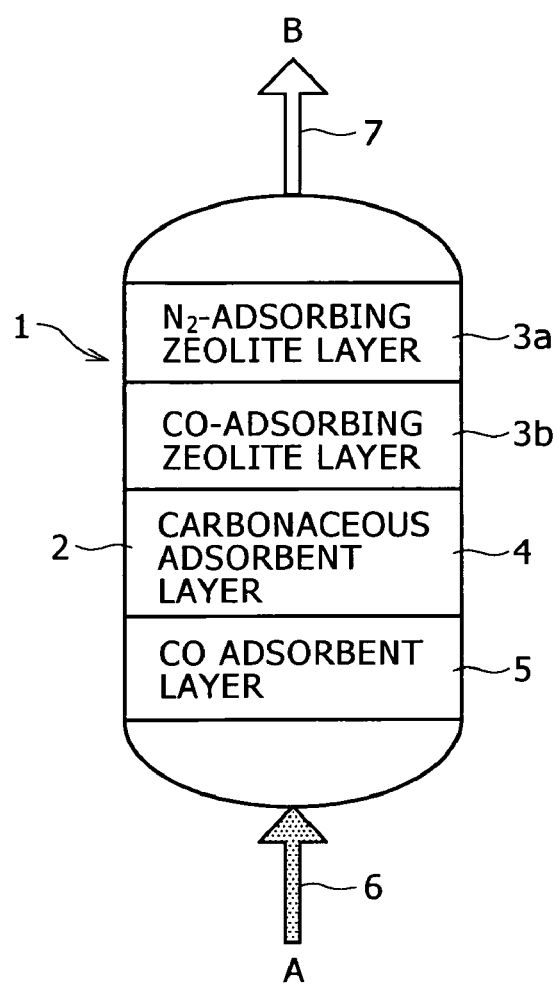
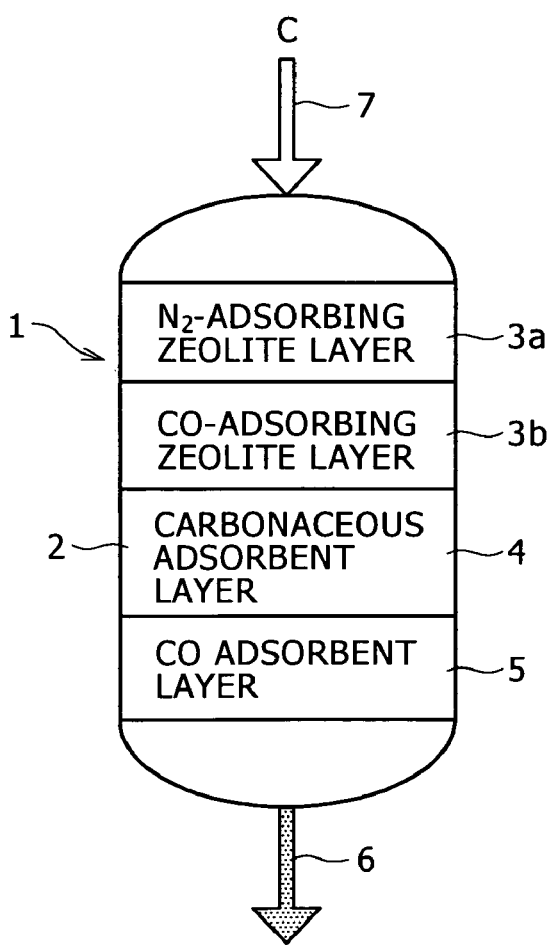

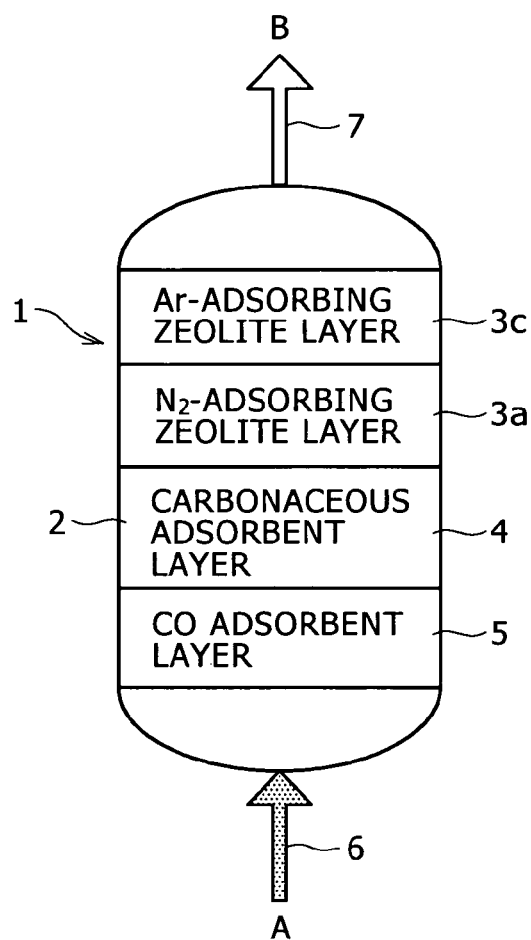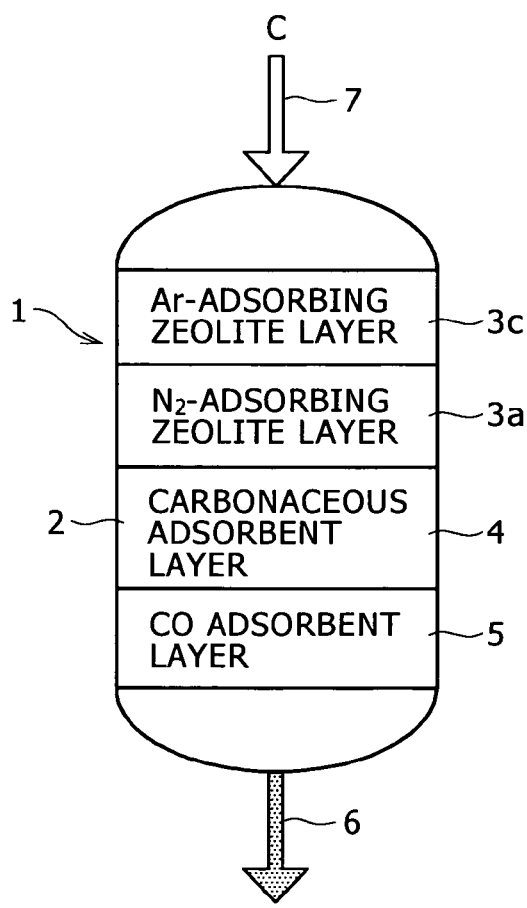

FIG.5A
FIG.5B
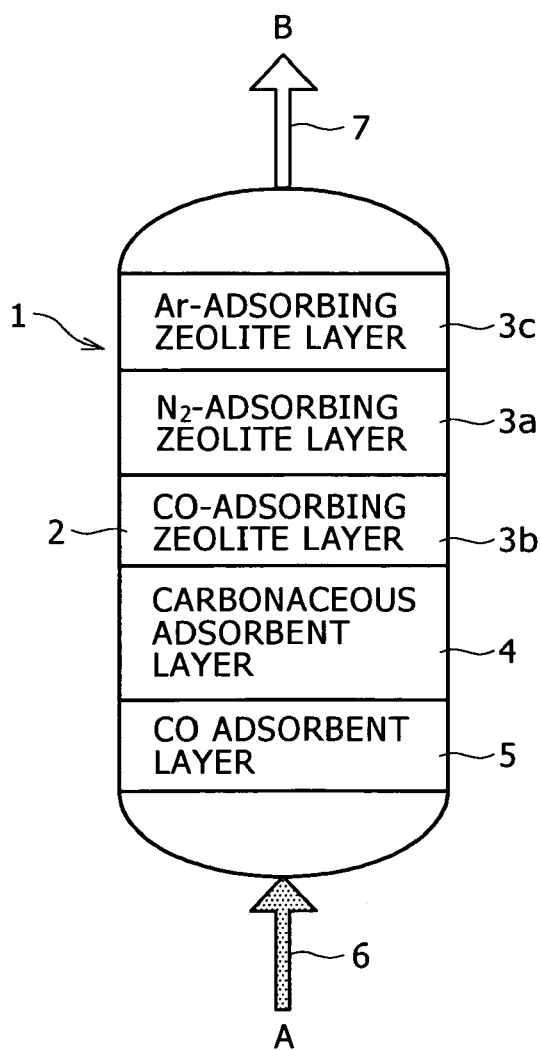
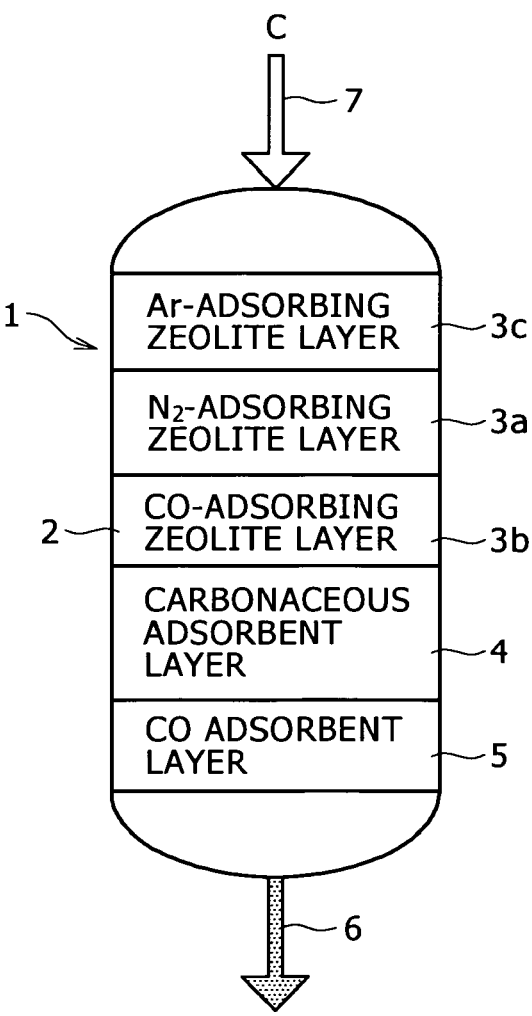

FIG.6A
FIG.6B
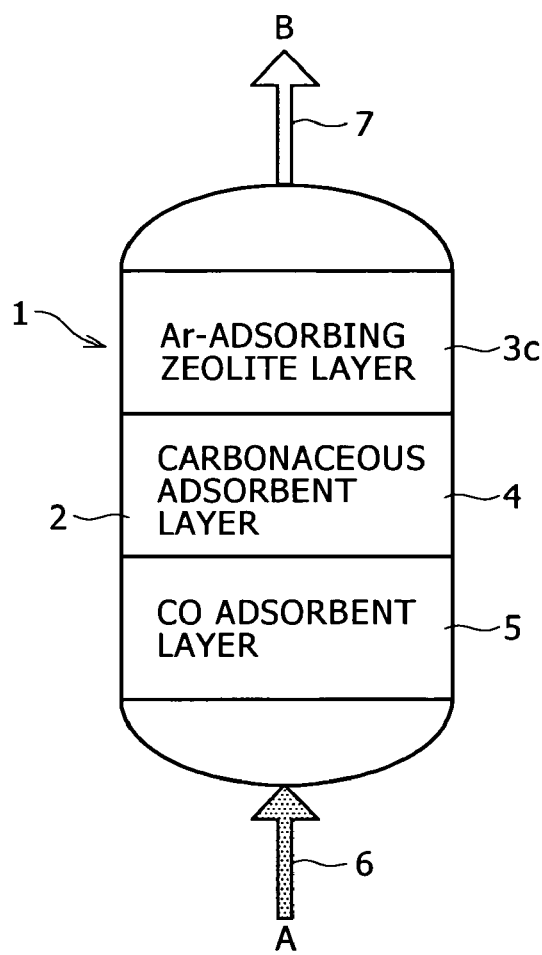
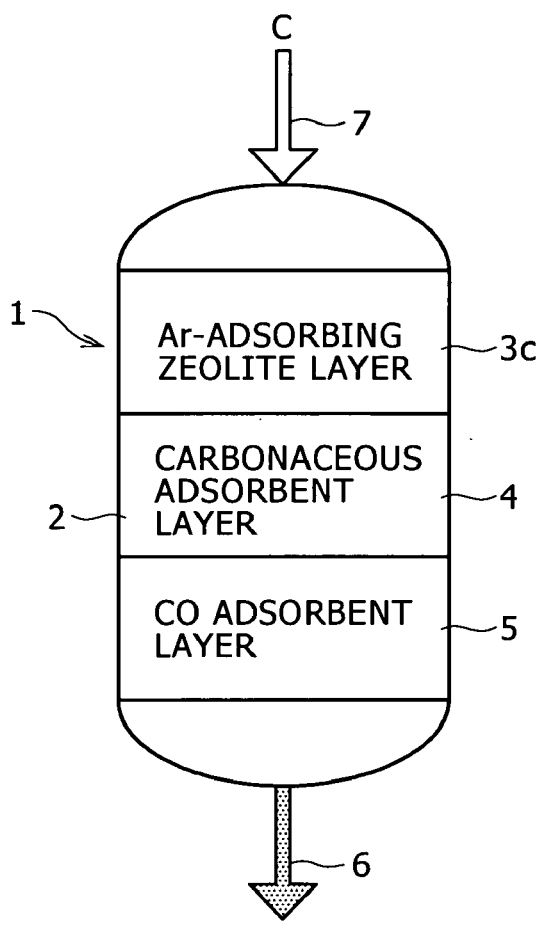

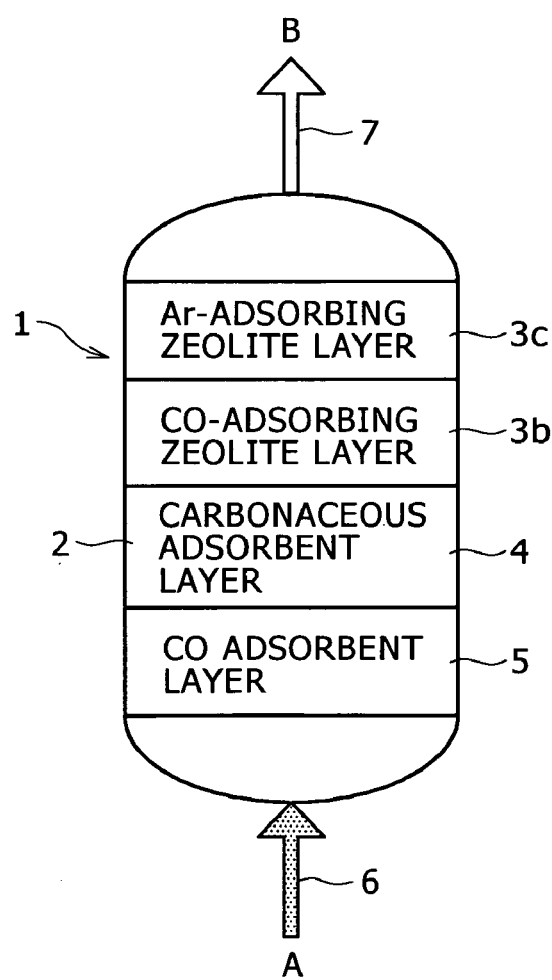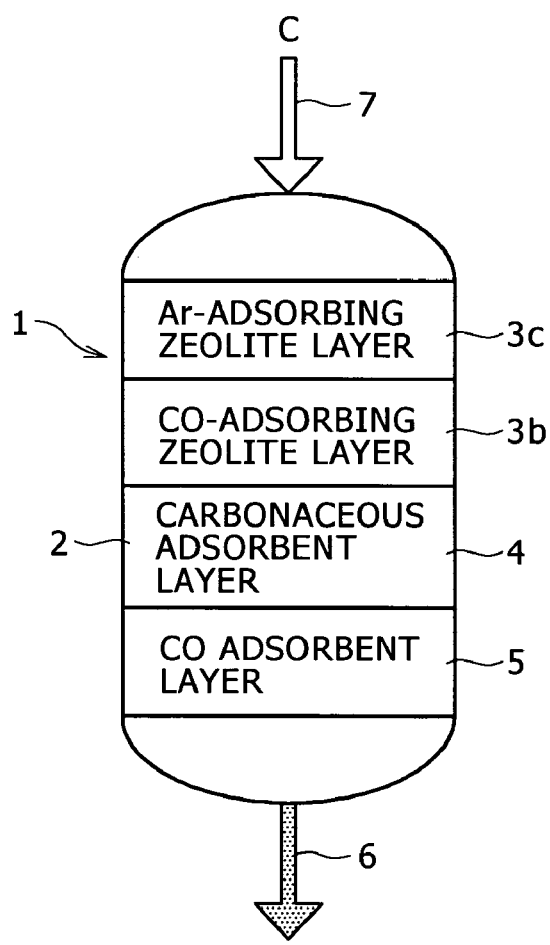

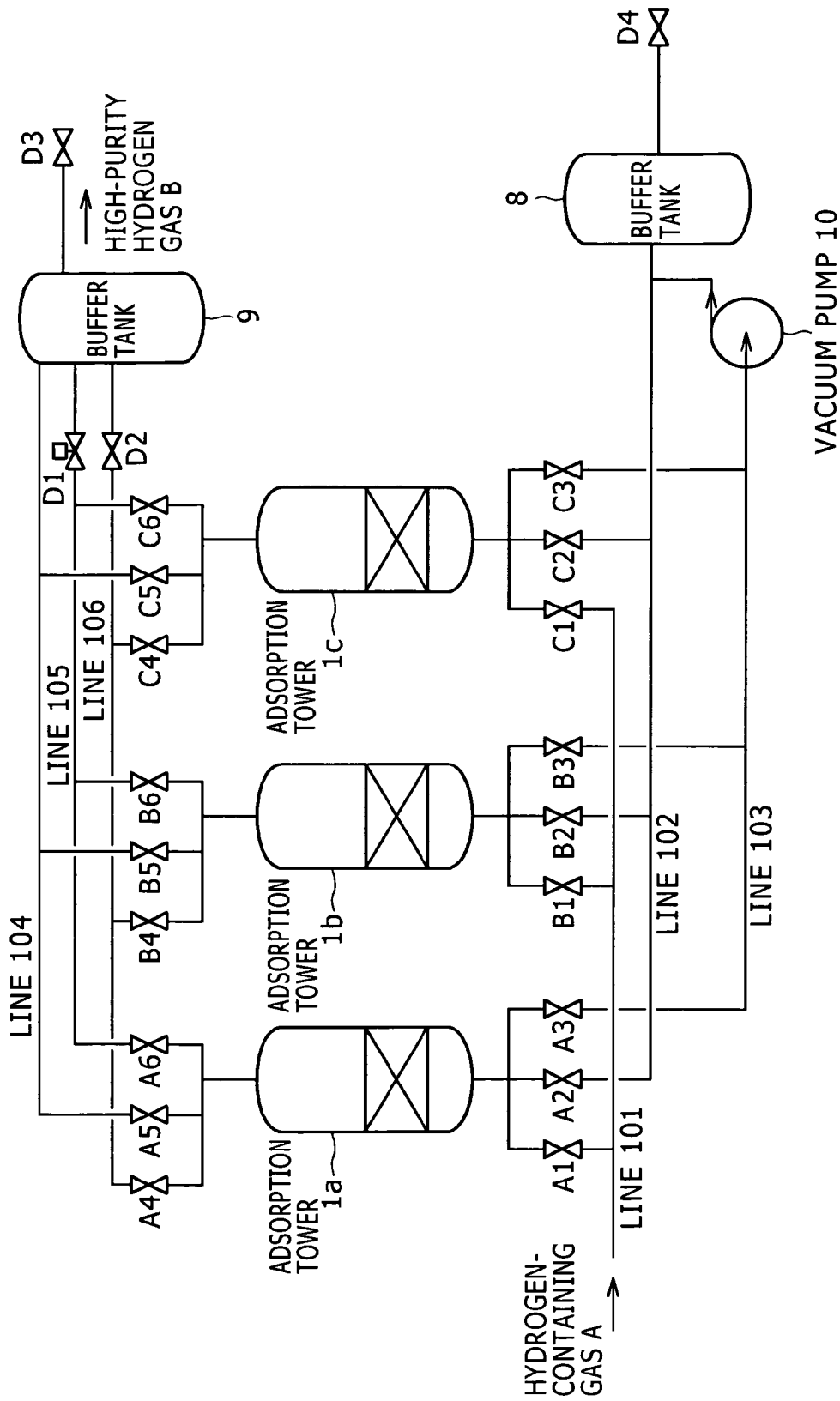

PSA APPARATUS FOR PRODUCING HIGH-PURITY HYDROGEN GAS

BACKGROUND OF THE INVENTION

1. Field of the Invention

The present invention relates to a PSA (pressure swing adsorption) apparatus for producing hydrogen gas for fuel cell and, more particularly, to a PSA apparatus improved so that such unnecessary gases such as CO, CH4, CO2, N2 and Ar which are by-products formed during the production of hydrogen gas to serve as a fuel cell energy source (fuel) can be efficiently removed by adsorption and the hydrogen gas production cost can be reduced accordingly.

2. Description of the Related Art

With measures for global warming prevention, it has become an important worldwide task in recent years to escape from the dependence of energy sources on crude oils and, not only in European advanced countries preceding in grappling with environmental preservation problems but also in the United States, Japan and other Asian countries, endeavors to put fuel cells using hydrogen gas as an energy source to practical use have been made actively.

While a number of studies are under way for developing improved methods of producing hydrogen gas to be used as a fuel for fuel cells, the production methods currently most practicable and most inexpensive use natural gas, LPG (liquefied petroleum gas), kerosene, gasoline, methanol or dimethyl ether as the raw material and produce hydrogen gas by reforming the same. In the processes for producing hydrogen gas by reforming such a raw material, for example in the process for producing hydrogen by reforming natural gas, the steam reforming technique is generally used most frequently. However, the steam reforming technique requires that the reforming reaction be caused to occur at a high temperature of about 700° C., and since this reforming reaction is an endothermic reaction, there arise problems: external heating becomes necessary, the reformer becomes increased in size and a prolonged period of time is required for starting. Autothermal reforming is a reforming technology improved about reformer size and starting time problems. According to this technology, the reaction involves not only a fuel and steam but is carried out in the presence of oxygen to combinedly utilize the heat generated by the oxidation reaction of the fuel and, accordingly, a reduction in size of the reformer and an improvement of the staring time are realized. In autothermal reforming, oxygen is sometimes used as an oxydant gas but, more conveniently, air is used. And air, natural gas and steam are mixed together and subjected to reforming, thereby a hydrogen-containing reformed gas is produced. Therefore, in this case, the reformed gas contains, together with hydrogen, at least steam (H2O), unreacted methane (CH4), carbon monoxide (CO), carbon dioxide (CO2) and nitrogen (N2). When air or oxygen-enriched gas manufactured by methods such as a PSA method from air as material is used as an oxydant gas, the reformed gas further contains argon (Ar) originating in air. Generally, the fuel hydrogen for fuel cell electric vehicles is required to have a hydrogen purity of about 4N (99.99% by volume (hereinafter "% by volume" is referred to as "%" for short)) or higher. And as for CO in particular, it is necessary to reduce the concentration thereof to a level of 10 ppm or lower from the viewpoint of preventing poisoning of platinum (Pt) used as an anode catalyst in solid polymer fuel cells. When the durability of fuel cells is taken into consideration, it is said to be necessary to reduce the CO concentration to a level of about 1 ppm or lower.

The hydrogen PSA method is a conventional method of purifying hydrogen gas from reformed gas. The hydrogen PSA method is a process of removing all of CO2, CH4, H2O, CO, N2 and Ar which are unnecessary gases in reformed gas, by using a plurality of adsorbents such as zeolite, activated carbon and alumina in combination under pressure swinging. In the case of the hydrogen gas which is to be fed to fuels cells for automobiles, it is also required that impurities other than CO be removed as well and, therefore, this hydrogen PSA method is generally employed in the case of producing fuel hydrogen by reforming a fossil fuel in hydrogen feeding stations.

When hydrogen gas is purified by the hydrogen PSA method, impurities other than H2 are removed by adsorption under elevated pressure to recover the product hydrogen gas. The adsorbent for PSA adsorbing the impurities CO, CH4, H2O, CO2, N2 and Ar is regenerated by release of the CO, CH4, H2O, CO2, N2 and Ar adsorbed thereon by an operation of reducing the adsorption tower inside pressure from the elevated level to ordinary pressure and an operation of purging with the product hydrogen gas. After regeneration of the adsorbent, the adsorption tower inside pressure is increased again. And the reformed gas flows into the tower to perform the product hydrogen gas purification operation.

In the conventional hydrogen PSA method, it is difficult to remove CO contained at a level of about 1% at a maximum in the hydrogen gas obtained by reforming a fossil fuel. And a large amount of an adsorbent (zeolite is generally used) is accordingly required, hence unfortunately the size of the hydrogen PSA equipment (adsorption tower size) becomes very large, and since the rate of recovery of the product hydrogen gas is low, the cost of hydrogen purification rises.

Various methods have so far been developed to cope with such problems. For example, Patent Document 1 discloses a method of increasing the hydrogen recovery rate by carrying out the step of the purging the adsorption tower after adsorption of impurities until at least a part of the purge gas introduced into the purging target tower is discharged from the tower, thereby the hydrogen gas recovery rate is increased from 70% (conventional method) to 76% at a maximum.

Patent Document 2 discloses a method of increasing the hydrogen gas recovery rate to 76% by utilizing, as a purge gas, the adsorption tower inside gas after finishing the adsorption step and increasing the amount of purge gas 2 to 7 times of the packed adsorbent volume. Further, Patent Document 3 discloses a method of reducing the hydrogen PSA equipment size and increasing the hydrogen recovery rate to 74% by using, as a single adsorbent, a zeolite having a faujasite structure with a Si/Al ratio of 1 to 1.5 and a lithium ion exchange rate of not lower than 95%.

However, these methods have limits in largely reducing the equipment size (adsorption tower size) since the CO gas adsorption capacity of the adsorbent is not sufficient. As regards the hydrogen recovery rate, improving measures by various methods such as those mentioned above have been investigated, however, any satisfactory measure is not available as yet.

Patent Document 4 discloses, as a method of reducing the adsorption tower size using a CO adsorbent, a method comprising disposing an adsorbent bed 2 obtained by successively layering an activated carbon layer 4, a CO adsorbent layer 5 and a zeolite layer 3 in the direction from the upstream side to the downstream side of the flow of a hydrogen-containing gas (cf. FIG. 9). From the explanation, since CO adsorbent is used with zeolite in this method, it is possible to reduce the amount of zeolite to be packed and thereby reduce the volume of the adsorption tower 1 and to reduce the amount of the product hydrogen gas to be used for adsorbent regeneration and thereby increase the hydrogen recovery rate. Further, since the CO adsorbent is higher in CO adsorption capacity as compared with zeolite when the CO concentration is high, this method is best suited for treating reformed gases containing CO at a level of not lower than 3 mol percent, in particular.

As a result of hydrogen purification tests using a CO adsorbent having a great CO adsorption capacity performed by the present inventors, it could be confirmed that the combined use of a CO adsorbent and zeolite can reduce the amount of zeolite to be packed. However, as described in Patent Document 4, it was also revealed that in the regenerating method of the adsorbent by feeding the high-purity hydrogen gas produced from an oxydant gas feeding route 6 to the adsorption tower 1 after pressure reduction to pass the gas through the adsorbent bed 2 thereby to release impurities adsorbed by the adsorbent bed 2, unfortunately the CO2 adsorbed mainly in the activated carbon layer 4 is released and then again adsorbed in the downstream-side zeolite layer 3 (zeolite being an adsorbent capable of adsorbing CO2 more strongly as compared with activated carbon), and CO2 re-adsorbed on zeolite cannot be regenerated (released) completely by the regeneration operation involving passage of high-purity hydrogen gas as a result. And it was also consequently revealed that the operation of removing impurity components in the oxydant gas by adsorption and the operation of regenerating the tower with high-purity hydrogen gas are repeated according to this method, the residual level of the re-adsorbed CO2 increases gradually at the time of reproduction in the zeolite layer 3 which initially has a sufficient level of CO adsorption capacity, thereby the CO adsorption capacity decreases, and as a result, the criterion "impurity CO concentration ≦1 ppm" required for hydrogen for fuel cells becomes no more satisfied.

[Patent Document 1]
  JP-A-2002-177726
[Patent Document 2]
  JP-A-2002-191923
[Patent Document 3]
  JP-A-2002-191924
[Patent Document 4]
  JP-A-2001-300244

SUMMARY OF THE INVENTION

In view of such state of the art, it is an object of the present invention to provide a PSA apparatus for high-purity hydrogen gas production which can recover high-purity hydrogen gas at a high recovery rate from a reformed gas (hydrogen-containing gas) produced by a reforming process, for example an autothermal reforming process, and containing, as impurity components, at least CO, CO2, N2 and/or Ar, and can contribute to reducing the equipment size, hence reducing the equipment cost.

According to the first aspect of the present invention, a PSA apparatus for high-purity hydrogen gas production by removing CO, CO2, N2 and/or Ar by adsorption from a hydrogen-containing gas, comprises an adsorption tower; and an adsorbent bed in the adsorption tower, successively including a CO adsorbent layer for selectively adsorbing CO gas without substantial adsorption of CO2, N2 and/or Ar, a carbonaceous adsorbent layer for adsorbing CO2, and after the two layers further including a zeolite layer for adsorbing N2, and/or an adsorbent layer for adsorbing Ar in random order in the direction from the upstream side to the downstream side of passage of the hydrogen-containing gas, wherein, on the occasion of regeneration of the adsorbent bed, a purge gas is passed through in the direction opposite to the direction of passage of the hydrogen-containing gas.

According to the second aspect of the present invention, a PSA apparatus for high-purity hydrogen gas production by removing CO, CO2, N2 and/or Ar by adsorption from a hydrogen-containing gas, comprises an adsorption tower; and an adsorbent bed in the adsorption tower, successively including a CO adsorbent layer for selectively adsorbing CO gas without substantial adsorption of CO2, N2 and/or Ar, a carbonaceous adsorbent layer for adsorbing CO2, and after the two layers further including a zeolite layer for adsorbing CO, a zeolite layer for adsorbing N2, and/or an adsorbent layer for adsorbing Ar in random order in the direction from the upstream side to the downstream side of passage of the hydrogen-containing gas, wherein, on the occasion of regeneration of the adsorbent bed, a purge gas is passed through in the direction opposite to the direction of passage of the hydrogen-containing gas.

According to the third and seventh aspects of the present invention, the adsorbent for adsorbing Ar may be type X zeolite, silver-exchanged zeolite or activated carbon in the PSA apparatus for high-purity hydrogen gas production according to the first or second aspect of the present invention.

According to the eighth aspect of the present invention, the zeolite for adsorbing CO may be type 5A zeolite in the PSA apparatus for high-purity hydrogen gas production according to the second aspect of the present invention.

According to the fourth and ninth aspects of the present invention, the zeolite for adsorbing N2 may be type X zeolite whose cation species are partly exchanged by Li ions or Ca ions in the PSA apparatus for high-purity hydrogen gas production according to the first or second aspect of the present invention.

According to the fifth and tenth aspects of the present invention, the CO adsorbent may be a material obtained by supporting a copper(I). halide and/or a copper(II) halide on at least one support selected from the group consisting of silica, alumina, and polystyrene type resins, or an adsorbent obtained by reduction treatment of the material in the PSA apparatus for high-purity hydrogen gas production according to the first or second aspect of the present invention.

According to the sixth and eleventh aspects of the present invention, the regeneration of the adsorbent bed may be carried out on the vacuum side lower than ordinary pressure in the PSA apparatus for high-purity hydrogen gas production according to the first or second aspect of the present invention.

According to the present invention, as the PSA apparatus for producing high-purity hydrogen gas by purifying a reformed gas containing impurities which are at least CO, CO2, N2 and/or Ar, a CO adsorbent capable of selectively adsorbing CO without substantial adsorption of CO2, N2 and/or Ar is used as the adsorbent for removing CO, and a purge gas successively passes the zeolite layer, carbonaceous adsorbent layer and CO adsorbent layer in the operation of regenerating the adsorbent bed. And it consequently becomes possible to realize a reduction in equipment size and prevent the CO2 released from the carbonaceous adsorbent layer from being re-adsorbed in the zeolite layer in the regeneration operation, and furthermore effectively utilize the CO2, N2 and/or Ar released from the zeolite layer for removing N2 and/or Ar and from the carbonaceous adsorbent layer as a part of the purge gas for the CO adsorbent layer, so that high-purity hydrogen gas can be recovered from the hydrogen-containing gas at a high recovery rate.

BRIEF DESCRIPTION OF THE DRAWINGS

FIGS. 1A and 1B are schematic representations of an adsorption tower in a PSA apparatus according to a first embodiment of the present invention;

FIGS. 3A and 3B are schematic representations of an adsorption tower in a PSA apparatus according to a second embodiment of the present invention;

FIGS. 4A and 4B are schematic representations of an adsorption tower in a PSA apparatus according to a third embodiment of the present invention;

FIGS. 5A and 5B are schematic representations of an adsorption tower in a PSA apparatus according to a fourth embodiment of the present invention;

FIGS. 6A and 6B are schematic representations of an adsorption tower in a PSA apparatus according to a fifth embodiment of the present invention;

FIGS. 7A and 7B are schematic representations of an adsorption tower in a PSA apparatus according to a sixth embodiment of the present invention;

FIG. 8 is a flowchart of a PSA apparatus in which the adsorption towers shown in FIG. 1, FIG. 3, FIG. 4, FIG. 5, FIG. 6 or FIG. 7 is used;

DETAILED DESCRIPTION OF THE PREFERRED EMBODIMENTS

Figure 2:
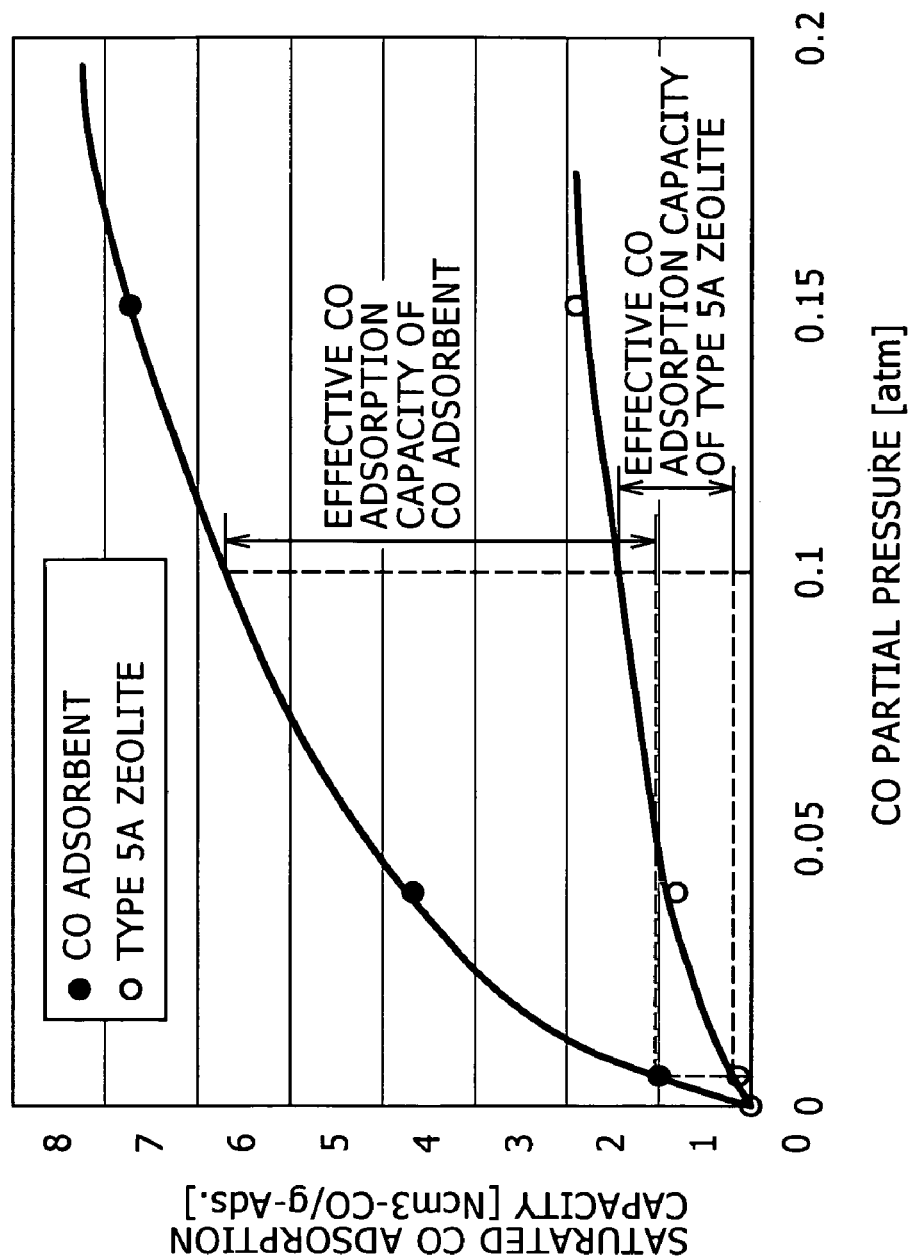
FIG. 2 is a graph of the relations between CO partial pressure and saturated CO adsorption capacity.
Figure 9:
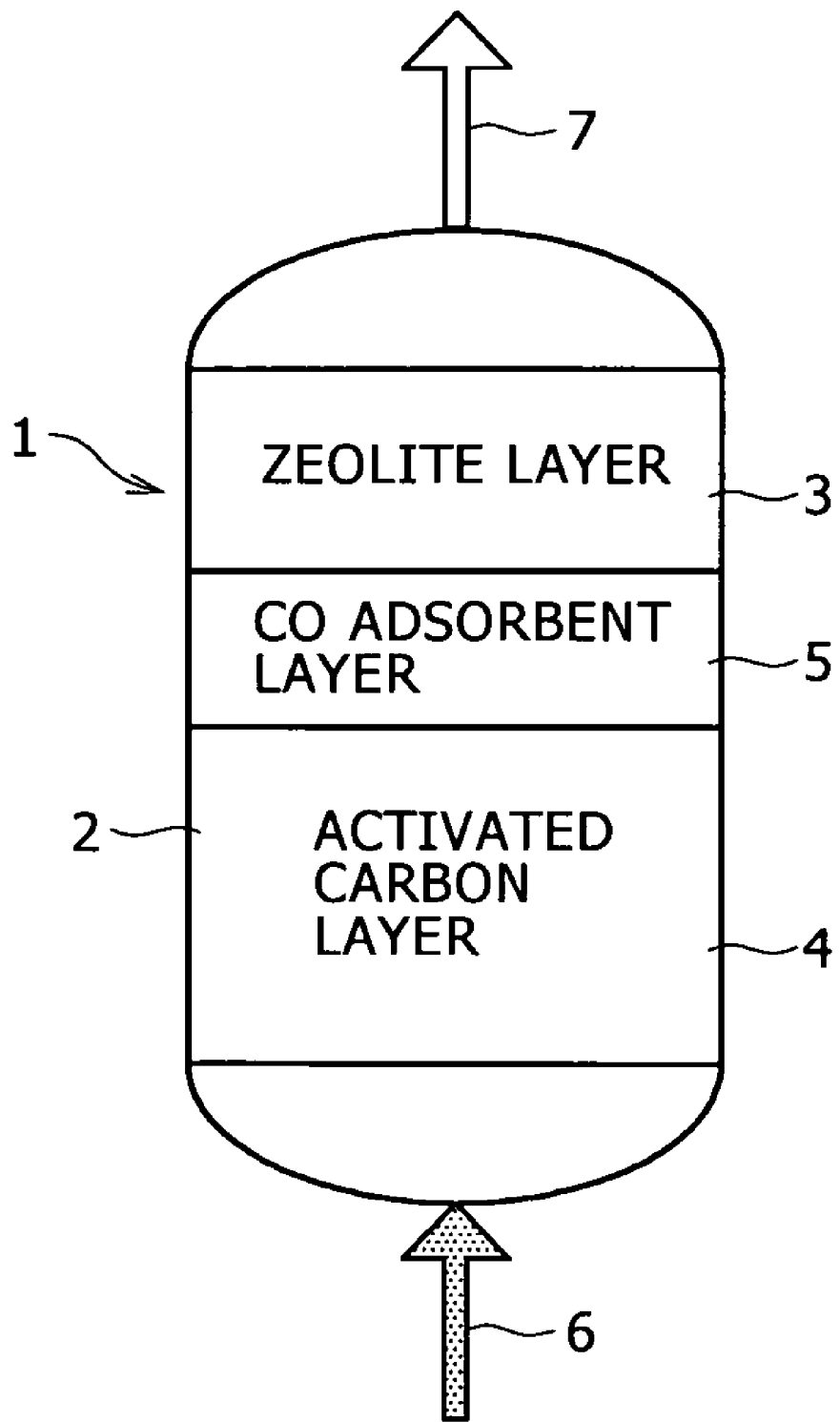
FIG. 9 is a schematic representation of an adsorption tower in a PSA apparatus according to the conventional art (described in Patent Document 4).

Referring to the attached drawings, embodiments of the present invention are now described in detail.

First Embodiment

FIG. 1 is a schematic representation of an adsorption tower in a PSA apparatus according to a first embodiment of the present invention.

Referring to FIG. 1A, a flow channel 6 for oxydant gas feeding is connected with the lower part of an adsorption tower 1, and a flow channel 7 for treated gas discharging is connected with the upper part thereof. An adsorbent bed 2 is provided in the adsorption tower 1. A CO adsorbent layer 5 for selectively adsorbing CO without substantial adsorption of CO2 and N2, a carbonaceous adsorbent layer 4 for adsorbing CO2, and a adsorbent layer 3a for adsorbing N2 (N2-adsorbing zeolite layer) are successively layered from the lower part of the adsorbent bed 2 to the upper part thereof (namely from the upstream side to the downstream side of the direction of passage of the hydrogen-containing gas A). At the time of regenerating the adsorbent bed 2, a purge gas C successively passes through the adsorbent layer 3a, carbonaceous adsorbent layer 4, and CO adsorbent layer 5 in the direction opposite to the direction of passage of the hydrogen-containing gas A as shown in FIG. 1B.

According to such constitution, CO alone in the hydrogen-containing gas (oxydant gas) is adsorbed by the CO adsorbent layer, CO2 out of the CO2 and N2 that pass through the CO adsorbent is adsorbed on the carbonaceous adsorbent in the next stage, and the N2 that passes through the carbonaceous adsorbent is adsorbed in the next zeolite layer in the adsorption operation. In the regeneration operation, the N2 adsorbed on the zeolite and the CO2 adsorbed on the carbonaceous adsorbent are released, and these released components serve as a gas for purging the CO adsorbent, and thus it becomes possible to reduce the amount of the purge gas (product hydrogen gas) required for regeneration of the CO adsorbent, increase the hydrogen recovery rate, and reduce the hydrogen purification cost.

It is recommended to use, as the CO adsorbent for selectively adsorbing CO without substantial adsorption of CO2 and N2, a material obtained by supporting a copper(I) halide and/or a copper(II) halide on at least one support selected from the group consisting of porous silica, porous alumina, and polystyrene resins which cause no substantial adsorption of CO2 and N2, or a material derived from such material by reduction treatment.

Thus, in the operation of regenerating the adsorbent bed 2, the unnecessary gas components N2 and CO2 released from the adsorbent layer 3 and carbonaceous adsorbent 4 are inhibited from being re-adsorbed in the CO adsorbent layer 5, and these unnecessary gas components can be utilized as a part of the purge gas, and accordingly the above-mentioned hydrogen recovery rate increasing effect can be produced.

When carbonaceous materials such as activated carbon or graphite are used as the support for the CO adsorbent, the unnecessary gas component CO2 released from the activated carbon layer 5 in the operation of regenerating the adsorbent bed 2 is re-adsorbed on the CO adsorbent, and the extent of effective utilization of this unnecessary gas component as a purge gas is thereby reduced, so that the hydrogen recovery rate improving effect cannot be obtained to a satisfactory extent.

Activated carbon and CMSs (carbon molecular sieves) are utilizable as the carbonaceous adsorbent.

Type X zeolite with cation species being partly exchanged by Li ions or Ca ions, is suited for use as the zeolite for adsorbing N2 (N2-adsorbing zeolite).

The reformed gas produced by the conventional autothermal technology for use as the oxydant gas contains, as impurities, CH4 and H2O in addition to CO, CO2 and N2. CH4 can be removed simultaneously with CO2 on the carbonaceous adsorbent, and as for H2O, it is also possible to provide an adsorbent layer of a water-removal activated alumina or the like either in the same adsorption tower or in a separate adsorption tower at a stage preceding the adsorbent bed 2 for protecting the carbonaceous adsorbent 4 and CO adsorbent layer 5 against the influence of moisture.

The regeneration of the adsorbent bed 2 is desirably carried out on the vacuum side (negative pressure side) lower than ordinary pressure. While it is also possible to carry out the adsorption operation at an elevated pressure, then reduce the pressure to ordinary pressure and cause a purge gas (product hydrogen gas) to pass through the bed for regeneration of the adsorbent, pressure reduction to the lower vacuum side using a vacuum pump facilitates the release of CO gas molecules chemically and strongly adsorbed on the CO adsorbent and, accordingly, the amount of the product hydrogen gas required for purging can be further reduced and the hydrogen recover rate is further increased. The degree of vacuum is preferably not higher than 50 kPa (absolute pressure), more preferably not higher than 20 kPa (absolute pressure).

In FIG. 2, there are shown the results (in the form of adsorption isotherms) of comparative investigation of the saturated CO gas adsorption capacities of the CO adsorbent and an existing type 5A zeolite adsorbent used as a CO adsorbent as determined from CO gas breakthrough curves obtained by varying the CO concentration (CO partial pressure) in the treatment target gas (simulated gas) under the following test conditions: pressure: 1 atm. (=0.101325 MPa), temperature: 40° C., SV: 1000 $h^{-1}$. Porous alumina and copper(I) chloride supported thereon is used as the CO adsorbent.

As is evident from the figure, a much higher saturated CO adsorption capacity can be obtained with the CO adsorbent as compared with the type 5A zeolite adsorbent. When, for example, the CO concentration in the treatment target gas is 1% by volume and the adsorption operation is carried out at 10 atm. (absolute pressure), followed by a regeneration operation at 1 atm. (absolute pressure), an effective CO adsorption capacity of 4.8 Ncm$^3$ of CO/g of adsorbent, which is the difference between the saturated CO adsorption capacity of 5.8 Ncm$^3$ of CO/g of adsorbent at the CO partial pressure of 0.1 atm. and the saturated CO adsorption capacity of 1.0 Ncm$^3$ of CO/g of adsorbent at the CO partial pressure of 0.01 atm., can be obtained with the CO adsorbent. To the contrary, the effective CO adsorption capacity attainable by using the type 5A zeolite adsorbent under the same conditions is merely 1.2 NCm$^3$ of CO/g of adsorbent. Therefore, it is seen that the use of the CO adsorbent in lieu of the existing type 5A zeolite adsorbent can reduce the necessary adsorbent amount by 3.6 Ncm$^3$ of CO/g of adsorbent, which is the difference between the effective CO adsorption capacities of both the adsorbents.

On the other hand, the saturated CO adsorption capacity at the CO partial pressure of 0.01 atm. is greater with the CO adsorbent and, therefore, the adsorbent regeneration is easier with the zeolite; a larger purge gas amount is required for regenerating the CO adsorbent.

Second Embodiment

Therefore, as an embodiment to produce high-purity hydrogen gas without contamination of CO into the product hydrogen gas in the adsorption operation and with a lower degree of vacuum and a smaller purge gas amount in the regeneration operation (second embodiment of the present invention), it is effective to combine CO adsorbent with higher effective CO adsorption capacity and a zeolite for adsorbing CO (CO-adsorbing zeolite) to use.

An example of adsorbent layers in this second embodiment is shown in FIG. 3. Thus, a CO adsorbent layer 5, a carbonaceous adsorbent layer 4 for adsorbing CO2, a adsorbent layer 3b for adsorbing CO (CO-adsorbing zeolite layer) and a adsorbent layer 3a for adsorbing N2 (N2-adsorbing zeolite layer) are successively layered in the direction from the upstream side to the downstream side of passage of the hydrogen containing gas A. The order of the CO-adsorbing zeolite layer 3b and the N2-adsorbing zeolite layer 3a may be reversed.

The above-mentioned type 5A zeolite can be properly utilized as the CO-adsorbing zeolite.

Among the N2-adsorbing zeolites, some zeolites adsorb CO as well. Therefore, it is also possible to select a N2-adsorbing adsorbent capable of adsorbing CO as well in the above-mentioned first embodiment (an example in which an N2-adsorbing zeolite layer alone is provided as the zeolite layer) instead of layering two separate zeolite layers, namely a CO-adsorbing zeolite layer and an N2-adsorbing one, as described above.

Third and Fourth Embodiments

The first and second embodiments mentioned above show the PSA apparatus producing high-purity hydrogen gas B from a hydrogen-containing gas A by removing CO, CO2 and N2 by adsorption as examples. Because air contains about 1% by volume of Ar, introducing an oxygen-enriched gas manufactured by an oxygen PSA apparatus or the like from air as material into a reformer makes a reformed gas contain Ar in addition to CO, CO2, and further contain N2 under certain circumstances. And for further increasing the purity of the high-purity hydrogen gas B, it is effective to combine an Ar-adsorbing adsorbent as embodiments in which Ar is removed together with CO and CO2, and N2 is further removed (third and fourth embodiments).

Examples of adsorbent layers in these third and fourth embodiments are shown in FIG. 4 and FIG. 5, respectively. In FIG. 4 and FIG. 5, an adsorbent layer 3c for adsorbing Ar (Ar-adsorbing zeolite layer) is further layered at the uppermost part within the adsorption tower 1 of FIG. 1 and FIG. 3 (the most downstream side of the direction of passage of the hydrogen-containing gas A). The parts other than this Ar-adsorbing zeolite layer 3c are identical in constitution, working and effect to the corresponding parts in the above-mentioned first and second embodiments, hence the explanation thereof is omitted. In the following, an explanation is given to the part relevant to the newly added Ar-adsorbing zeolite layer 3c alone.

In FIG. 4 and FIG. 5, the Ar-adsorbing zeolite layer 3c is layered at the uppermost part within the adsorption tower 1 (the most downstream side of the direction of passage of the hydrogen-containing gas A). In FIG. 4, the layering order of the N2-adsorbing zeolite layer 3a and the Ar-adsorbing zeolite layer 3c may be reversed. In FIG. 5, the CO-adsorbing zeolite layer 3b, the N2-adsorbing zeolite layer 3a and the Ar-adsorbing zeolite layer 3c may be layered in random order among them.

Type X zeolite, in particular type X zeolite with the cation species partly or wholly exchanged with Ca, and mordenite type, type ZSM-5, type Y, type X and the like with the cation species exchanged with Ag, and activated carbon are suitably used as Ar-adsorbing adsorbent.

Since some Ar-adsorbing adsorbents are capable of adsorbing N2 as well, an Ar-adsorbing adsorbent which can adsorb N2 as well may be selected in FIG. 4 and FIG. 5 instead of layering two separate adsorbents, namely an N2-adsorbing zeolite and an Ar-adsorbing adsorbent.

Further, since some Ar-adsorbing adsorbents are capable of adsorbing N2 and CO as well, an Ar-adsorbing adsorbent which can adsorb N2 and CO as well may be selected in FIG. 5 instead of layering three separate adsorbents, namely a CO-adsorbing zeolite, an N2-adsorbing zeolite and an Ar-adsorbing adsorbent.

FIGS. 6 and 7 show examples of layered adsorbents in the adsorption tower 1 of the PSA apparatus in the case of the oxygen-enriched gas introduced into a reformer not substantially containing N2 (fifth and sixth embodiments). And N2-adsorbing zeolite layer can be excluded as shown in the Figs.

The Ar-adsorbing zeolite layer 3c is layered at the uppermost part within the adsorption tower 1 (the most downstream side of the direction of passage of the hydrogen-containing gas A) in FIG. 7 as an example like in FIG. 5. However, the CO-adsorbing zeolite layer 3b and the Ar-adsorbing zeolite layer 3c may be layered in random order among them.

Hereinafter, an example of the constitution of the PSA apparatus using adsorption towers shown in FIG. 1, 3, 4, 5, 6 or 7 is explained referring to the flowchart shown in FIG. 8. The PSA apparatus in this example comprises three adsorption towers 1a, 1b and 1c, and the adsorbent bed 2 mentioned above is disposed in each of the adsorption towers 1a to 1c. The line 101 is a line for introducing a hydrogen-containing gas A. The line 101 is connected with the adsorption towers 1a to 1c via a valve A1, a valve B1 and a valve C1, respectively.

The line 102 is a line to be used for reducing the adsorption tower inside pressure and is used for reducing the pressure in each adsorption tower after completion of pressure equalization (cf. the pressure equalization step described later herein) further to a level around ordinary pressure (cf. the first pressure reduction step described later herein). The line 102 is connected with the adsorption towers 1a to 1c via a valve A2, a valve B2 and a valve C2, respectively.

The line 103 is a line for reducing the pressure in each adsorption tower, after completion of pressure reduction to a level around ordinary pressure (first pressure reduction step), further to a negative pressure level being atmospheric pressure or less (−0.05 MPa (gage pressure) or less) (cf. the second pressure reduction step described later herein) and serves to connect a vacuum pump 10 with the adsorption towers 1a to 1c via a valve A3, a valve B3 and a valve C3, respectively. The exhaust gas discharged by the vacuum pump 10 through the line 102 and line 103 is temporarily stored in a buffer tank 8. The gas stored in the buffer tank 8 can be effectively utilized as calorie gas, for example, as a fuel for the reformer in producing the hydrogen-containing gas A.

The line 104 is a line for recovering the high-purity hydrogen gas B obtained by removing unnecessary gases from the hydrogen-containing gas A in the adsorption towers and is connected with the adsorption towers 1a to 1c via a valve A5, a valve B5 and a valve C5, respectively, and the high-purity hydrogen gas B recovered is temporarily stored in a buffer tank 9.

The line 105 is a line for regenerating the adsorption towers by purging after pressure reduction to a negative pressure level (on the vacuum side) (cf. the second pressure reduction step described later herein) following completion of the step of adsorbing unnecessary gases from the hydrogen-containing gas A. The adsorption towers 1a to 1c are connected with the buffer tank 9 via a valve D1, a valve A6, a valve B6 and a valve C6, and a part of the high-purity hydrogen gas B recovered is used as the purge gas for adsorbent regeneration.

The line 106 is a line for carrying out pressure equalization (pressure equalization step) and is used for effecting gas pressure equalization between an adsorption tower after completion of the unnecessary gas adsorption step and a tower after completion of the adsorbent regeneration step (described later herein). More specifically, those two of the valves A4, B4 and C4 which are connected with the two towers between which pressure equalization is to be carried out are opened and the remaining valve is closed, thereby it becomes possible to effect pressure equalization between the two adsorption towers.

The operation procedures for unnecessary gas removal by adsorption and adsorbent regeneration are now described specifically. Although the operation procedures for the adsorption tower 1a alone are described in the following, the operation is carried out cyclically using the three adsorption towers 1a, 1b and 1c, as shown in the timetable given below in Table 1.

1) [Unnecessary gas adsorption step]: The hydrogen-containing gas A increased in pressure to about 1.0 MPa (gage pressure) is introduced into the adsorption tower 1a, unnecessary gases are removed by means of the adsorbents, and high-purity hydrogen gas B is recovered (valves A2, A3, A4, A6: closed; valves A1, A5: opened).

2) [Pressure equalization step]: The unnecessary gas adsorption operation (unnecessary gas adsorption step) is finished; a part of the gas in the adsorption tower 1a is allowed to enter the adsorption tower 1c after completion of the regeneration operation (adsorbent regeneration step). Here, when the unnecessary gas adsorption operation in the adsorption tower 1a is carried out at 0.9 MPa (gage pressure), for instance, the adsorbents in the adsorption tower 1c are regenerated under reduced pressure and, therefore, both the inside pressures in the adsorption towers 1a and 1c become about 0.5 MPa (gage pressure) in this step (valves A1, A2, A3, A5, A6, valves C1, C2, C3, C5, C6: closed; valve A4, valve C4: opened).

3) [First pressure reduction step]: The inside pressure in the adsorption tower 1a after completion of the pressure equalization operation (pressure reduction step) is reduced to a level around ordinary pressure (valves A1, A3, A4, A5, A6: closed; valve A2: opened).

4) [Second pressure reduction step]: The pressure in the adsorption tower 1a after pressure reduction to a level around ordinary pressure is further reduced to a negative pressure level using the vacuum pump 10 (valves A1, A2, A4, A5, A6: closed: valve A3: opened).

5) [Adsorbent regeneration step]: In the reduced pressure condition, a purge gas (part of high-purity hydrogen gas) is passed through the tower to thereby regenerate the adsorbents (valves A1, A2, A4, A5: closed; vales A3, A6, valve D1: opened).

6) [Pressure equalization step]: A part of the gas in the adsorption tower 1b after completion of the unnecessary gas adsorption step is allowed to enter the adsorption tower 1a after completion of the adsorbent regeneration (valves A1, A2, A3, A5, A6, valves B1, B2, B3, B5, B6: closed; valve A4, valve B4: opened).

7) [Pressure raising step]: The high-purity hydrogen gas B is introduced from the buffer tank 9 into the adsorption tower 1a to raise the pressure in the adsorption tower 1a to a pressure level at which the unnecessary gas adsorption operation is carried out (valves A1, A2, A3, A4, A6: closed; valve A5: opened).

8) The above-mentioned operation steps 1) to 7) are repeated, and the unnecessary gas adsorption/removal and the adsorbent regeneration operations are thus repeated.

The PSA apparatuses according to the present embodiments are a process for regenerating the adsorbents at a negative pressure level (vacuum side) resulting from pressure reduction to a level lower than ordinary pressure and removing unnecessary gases from a hydrogen-containing gas A by adsorption at an elevated pressure, and it makes it possible to realize unnecessary gas removal from the hydrogen-containing gas A in compact equipment and further makes it possible to increase the hydrogen recovery rate.

TABLE 1

| | Adsorption tower | | |
| --- | --- | --- | --- |
| | 1a | 1b | 1c |
| Operation step | Adsorption | Pressure equalization | |
| | | Pressure raising | First pressure reduction |
| | | | Second pressure reduction |
| | | | Regeneration |
| | Pressure equalization | Adsorption | Pressure equalization |
| | First pressure reduction | | Pressure raising |
| | Second pressure reduction | | |
| | Regeneration | | |
| | Pressure equalization | | |
| | Pressure raising | First pressure reduction | Adsorption |
| | | Second pressure reduction | |
| | | Regeneration | |

In the above embodiments, examples of the PSA comprise three adsorption towers, but the apparatus may be constituted by two adsorption towers or four or more adsorption towers.

When the apparatus is constituted by two towers, it is impossible to realize the pressure equalization operation using two towers as explained in the above embodiments, and the pressure energy of the gas increased in pressure cannot be recovered effectively, and it is accordingly recommended that the apparatus be constituted by three or more towers.

In cases where it is not necessary to produce high-purity hydrogen gas continuously for a long period of time, the apparatus may be constituted by one single adsorption tower.

What is claimed is:

1. A PSA apparatus for high-purity hydrogen gas production by removing CO, CO2, N2 and/or Ar by adsorption from a hydrogen-containing gas, comprising:
   an adsorption tower; and
   an adsorbent bed in said adsorption tower, successively including a CO adsorbent layer for selectively adsorbing CO gas without substantial adsorption of CO2, N2 and/or Ar, a carbonaceous adsorbent layer for adsorbing CO2, and after said two layers further including a zeolite layer for adsorbing N2, and/or an adsorbent layer for adsorbing Ar in random order in the direction from the upstream side to the downstream side of passage of the hydrogen-containing gas,
   wherein, on the occasion of regeneration of said adsorbent bed, a purge gas is passed through in the direction opposite to the direction of passage of the hydrogen-containing gas.

2. A PSA apparatus for high-purity hydrogen gas production by removing CO, CO2, N2 and/or Ar by adsorption from a hydrogen-containing gas, comprising:
   an adsorption tower; and
   an adsorbent bed in said adsorption tower, successively including a CO adsorbent layer for selectively adsorbing CO gas without substantial adsorption of CO2, N2 and/or Ar, a carbonaceous adsorbent layer for adsorbing CO2, and after said two layers further including a zeolite layer for adsorbing CO, a zeolite layer for adsorbing N2, and/or an adsorbent layer for adsorbing Ar in random order in the direction from the upstream side to the downstream side of passage of the hydrogen-containing gas,
   wherein, on the occasion of regeneration of said adsorbent bed, a purge gas is passed through in the direction opposite to the direction of passage of the hydrogen-containing gas.

3. A PSA apparatus for high-purity hydrogen gas production as claimed in claim 1, wherein said adsorbent for adsorbing Ar is type X zeolite, silver-exchanged zeolite or activated carbon.

4. A PSA apparatus for high-purity hydrogen gas production as claimed in claim 1, wherein said zeolite for adsorbing N2 is type X zeolite whose cation species are partly exchanged by Li ions or Ca ions.

5. A PSA apparatus for high-purity hydrogen gas production as claimed in claim 1, wherein said CO adsorbent is a material obtained by supporting a copper(I) halide and/or a copper(II) halide on at least one support selected from the group consisting of silica, alumina, and polystyrene type resins, or an adsorbent obtained by reduction treatment of said material.

6. A PSA apparatus for high-purity hydrogen gas production as claimed in claim 1, wherein the regeneration of said adsorbent bed is carried out on the vacuum side lower than ordinary pressure.

7. A PSA apparatus for high-purity hydrogen gas production as claimed in claim 2, wherein said adsorbent for adsorbing Ar is type X zeolite, silver-exchanged zeolite or activated carbon.

8. A PSA apparatus for high-purity hydrogen gas production as claimed in claim 2, wherein said zeolite for adsorbing CO is type 5A zeolite.

9. A PSA apparatus for high-purity hydrogen gas production as claimed in claim 2, wherein said zeolite for adsorbing N2 is type X zeolite whose cation species are partly exchanged by Li ions or Ca ions.

10. A PSA apparatus for high-purity hydrogen gas production as claimed in claim 2, wherein said CO adsorbent is a material obtained by supporting a copper(I) halide and/or a copper(II) halide on at least one support selected from the group consisting of silica, alumina, and polystyrene type resins, or an adsorbent obtained by reduction treatment of said material.

11. A PSA apparatus for high-purity hydrogen gas production as claimed in claim 2, wherein the regeneration of said adsorbent bed is carried out on the vacuum side lower than ordinary pressure.

* * * * *